Oct. 6, 1931.  A. J. MUELLER  1,825,884

AUTOMOTIVE VEHICLE HEATER

Filed Feb. 6, 1929

Inventor

August J. Mueller

By Lynn H. Latta

Attorney

Patented Oct. 6, 1931

1,825,884

UNITED STATES PATENT OFFICE

AUGUST J. MUELLER, OF YANKTON, SOUTH DAKOTA

AUTOMOTIVE VEHICLE HEATER

Application filed February 6, 1929. Serial No. 337,834.

My invention relates to automotive vehicle heaters of the hot water type and has for its general object to provide a heater of this type which is of comparatively simple construction and yet very efficient in operation.

A further object of my invention is to provide a heater adapted to be connected to the cooling system of an automobile and pro10 vided with means for diverting the flow of hot water to the heater or for shutting off the flow of hot water to the heater.

A further object is to provide a heater of this type which may be readily attached to the vehicle to which it is to be applied.

A further object is to provide an effective radiator as a part of the heater.

With these and other objects in view, my invention consists in the construction, ar20 rangement and combination of the various parts of my device, whereby the objects contemplated are attained, as hereinafter more fully set forth, pointed out in my claims, and illustrated in the accompanying drawings, in which:

Figure 1:
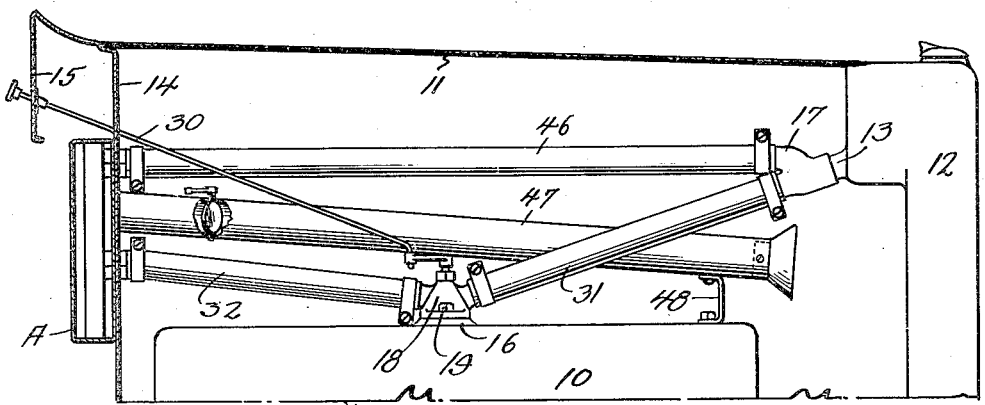
Fig. 1 is a longitudinal, sectional view through the hood of an automobile on which my heater is installed.
Figure 2:
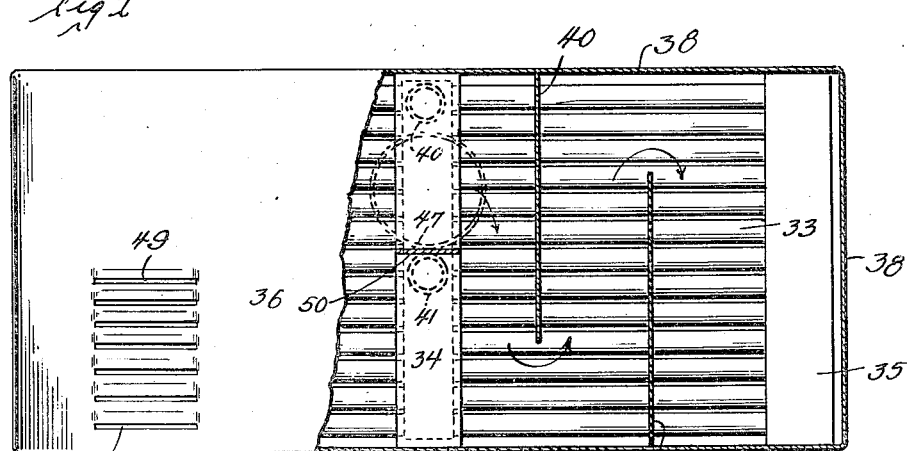
Fig. 2 is a rear elevation of the radiator parts being broken away to partly illustrate the construction.
Figure 3:
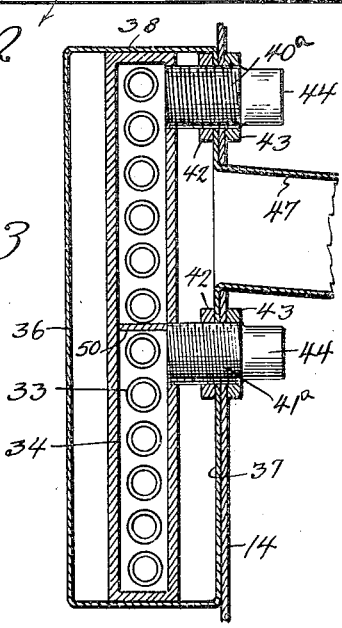
Fig. 3 is a central transverse, sectional view through the radiator installed on the dash, and Figure 4:
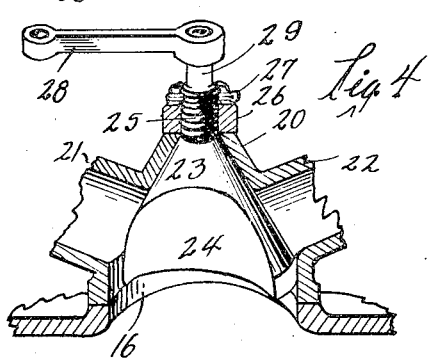
Fig. 4 is a detail. sectional view of the valve.

I have used the reference character 10 to indicate generally the cylinder head water jacket of an engine in an automobile having the hood 11, the radiator 12, the upper radiator hose connection 13, the dash 14, the instrument panel 15 and the upper water jacket vent 16.

Ordinarily there is a direct hose connec45 tion between the vent 16 and the hose connection 13. In installing my invention, this is removed and a Y connection 17 is attached to the connection 13. A valve 18 is attached to the vent 16, the casing of the valve being made in various shapes and sizes so as to take the same bolts 19 that are ordinarily used in securing the hose connection to the cylinder head. The valve casing 20 is conical in shape and is provided with diametrically opposed necks 21 and 22, respectively. The valve element 23 is conical in shape and half its thickness is cut away as at 24.

The valve element is provided with a threaded neck 25 and a nut 26 is threaded onto the neck 25 and closes the upper extremity of the casing 20. The valve 23 is maintained in snug engagement with the sides of the casing wall 20 by the nut 26 and the latter may be adjusted to vary the tightness of engagement of the valve. In order to prevent the nut working loose it is preferably of the castle nut type and is held in place by a cotter key 27.

A lever 28 is secured to the upper end of the stem 29 of the valve and is connected to the instrument panel 15 by means of a rod 30.

The opening 24 in the valve element 23 is such as to open both necks 21 and 22 simultaneously to one-half their cross sectional area. To this end the valve must be rotated to an intermediate position where the edges of the opening 24 intersect the openings of the necks 21 and 22 at their centers. Rotation of the valve in one direction from this intermediate position will close off one of the necks and open the other one correspondingly. Rotation of the valve in the other direction from this intermediate position will reverse the order of opening and closing. The neck 22 is connected by a pipe 31 to the Y connection 17 and the neck 21 is connected by a pipe 32 to the radiator A.

The radiator A comprises generally a radiating element and a casing. The radiating element is made up of a number of horizontal pipes 33, which are disposed in pairs, separated and secured together by a central, hollow post 34. The ends of the respective pairs of pipes 33 are connected by similar hollow posts 35.

A partition 50 in the hollow post 34 just above the connection pipe 31 prevents the hot water from passing directly upwardly to the outlet 40, thereby directing it through the lower set of horizontal pipes to the hollow posts 35, then upward through said hollow posts 35 and back to the central post 34 through the upper horizontal pipes and then out through the connection pipe 40.

A casing having the rear wall 36, the front wall 37, and the side walls 38 incloses the radiating element 33 and the space within the casing is divided into a tortuous passage by baffle plates 40 and 41, respectively. The construction and arrangement of these baffle plates, in combination with the casing, is thought to be obvious from the drawings. Each plate 41 extends from the front wall 37 to the rear wall 36 and the tubes 33 pass through the plates.

A pair of water connections 40 and 41a, respectively, are secured in the post 34, extending rearwardly through the casing wall 37 and are adapted to support the radiator on the dash 14 by extending through openings formed in the dash.

Nuts 42 and 43 are threaded onto the connections 40a and 41a in order to secure the radiator to the dash. The projecting nipples 44 are provided to receive the respective hose pipes.

The upper nipple 44 is connected to the Y connection 17 by means of a pipe 46.

The air casing is provided with an air supply tube 47, which is extended forwardly and is supported by a bracket 48 secured to the water jacket 10. Air from the vehicle fan, which is not shown in the drawings, is taken through the pipe 47 and into the radiator casing, where it must pass between the tubes 33 and through the tortuous passageways around the baffle plates 40 and 41 before it can be discharged through the vent slots 49, in the wall 36. It will be noted in this connection that the air tube 47 is connected to the casing midway between its ends so that the air is taken in between the baffle plates 40. The air will be very thoroughly heated before being discharged from the air vents, due to its enforced travel around the tubes 33 throughout their entire length.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In an automotive vehicle heater, a casing, a hot water radiator mounted in said casing and provided with a pair of water connections extending through the casing and adapted to extend through a dash to support the radiator and casing, the radiator including spaced pipes, and the casing being provided with partitions extending transversely of said pipes, each attached to three walls of the casing, and spaced from a fourth, said partitions being staggered to form tortuous passageways, and an air inlet pipe communicating with the casing near the center, the casing being perforated at points remote from the air pipe to provide air outlets.

2. In an automotive vehicle heater, a casing having an air intake near the center and discharge vents in remote parts, a hot water radiator provided with a pair of water connections extended through the casing and adapted to extend through the dash to support the radiator and casing, partitions within the casing attached to three walls of said casing and spaced from a fourth wall to provide tortuous passages for the air to travel from the air intake to the discharge vents.

3. In an automotive vehicle heater, a casing, a hot water radiator mounted in the casing and having water inlet and outlet connections extending through the casing, said radiator including spaced pipes, the casing being provided with partitions extending transversely of said pipes, each partition being attached to three walls of the casing and spaced from a fourth, said partitions being staggered to form tortuous passages, an air inlet pipe communicating with the casing near the center, the casing being perforated at points remote from the air pipe, and means for attaching the heater to an automobile dash.

Signed this 28 day of January, 1929, in the county of Woodbury and State of Iowa.

AUGUST J. MUELLER.